United States Patent [19]

Wojtowicz

[11] 4,253,950

[45] Mar. 3, 1981

[54] METHOD FOR CLEANING WATER CONTAINING DEVICES

[75] Inventor: John A. Wojtowicz, Cheshire, Conn.

[73] Assignee: Olin Corporation, New Haven, Conn.

[21] Appl. No.: 16,664

[22] Filed: Mar. 1, 1979

[51] Int. Cl.³ .............................................. C02F 5/08
[52] U.S. Cl. .................... 210/696; 4/DIG. 9; 210/756; 252/175
[58] Field of Search ............ 4/228, DIG. 9, DIG. 10; 134/2; 252/106, 175, 176, 181; 210/50, 57, 58, 59, 62, 64, 167; 423/473; 424/149

[56] References Cited

U.S. PATENT DOCUMENTS

| | | | |
|---|---|---|---|
| 490,797 | 1/1893 | Woolf | 424/149 |
| 1,638,643 | 8/1927 | Schlosstein | 424/149 |
| 2,807,807 | 10/1957 | Harper | 4/228 |
| 3,582,265 | 6/1971 | Bishop et al. | 423/473 |
| 3,604,020 | 9/1971 | Moisa | 4/228 |
| 3,837,017 | 9/1974 | McDuffee | 4/228 |
| 3,997,460 | 12/1976 | Sirine et al. | 252/106 |
| 4,071,605 | 1/1978 | Wojowicz | 423/473 |
| 4,123,377 | 10/1978 | Davey et al. | 423/473 |

Primary Examiner—Peter A. Hruskoci
Attorney, Agent, or Firm—William D. Sabo; Donald F. Clements

[57] ABSTRACT

A process is described for cleaning water containing devices, for example, conventional home flush toilet bowls. Dibasic magnesium hypochlorite is dissolved in the water in the flush tank and thereafter delivered to the bowl when the toilet is flushed. This technique minimizes the deposition of scale on the toilet flush tank and the toilet bowl surface in contact with the water.

13 Claims, No Drawings

METHOD FOR CLEANING WATER CONTAINING DEVICES

The present invention relates to a method for cleaning water containing devices. More particularly, the invention relates to a method for cleaning toilet bowls and minimizing scale deposition in the flush water tank and on toilet bowl surfaces contacted by the flush water.

Numerous chemical compounds are disclosed in the prior art for deodorizing or disinfecting toilet bowls, urinals, garbage storage devices, and the like.

For example, U.S. Pat. No. 490,797, issued to Albert E. Woolf on Jan. 31, 1893, discloses the use of aqueous solutions containing hypochlorites of sodium and magnesium, and free oxygen and ozone, for deodorizing and disinfecting garbage offal, clothing and sanitizing sewage.

U.S. Pat. No. 1,638,643, issued to Hans Schlosstein on Aug. 9, 1927, discloses an antiseptic or a disinfecting compound of a hydrous-alumino-silicate containing magnesium hypochlorite combined therewith double salts of aluminum and magnesium hypochlorites.

U.S. Pat. No. 4,071,605, issued to John A. Wojtowicz on Jan. 31, 1978, discloses that dibasic magnesium hypochlorite is useful in bleaching and sanitizing applications.

U.S. Pat. No. 4,123,377, issued to Christopher R. Davey and Peter J. Buckley on Oct. 31, 1978, discloses a particulate four component detergent composition containing dibasic magnesium hypochlorite having a specific small particle size as a bleaching agent component therein for washing clothing.

None of these references suggest that an aqueous solution of dibasic magnesium hypochlorite attacks scale, such as toilet bowl scale, or prevents the deposition of scale in toilet bowl or other water containing devices.

Various chemicals which have been employed as deodorants and sanitizers in toilet bowls include chlorine releasing compounds such as calcium hypochlorite. For example, U.S. Pat. No. 3,837,017, issued to Richard L. McDuffee on Sept. 24, 1974, discloses a system for cleaning toilet bowls wherein a container of calcium hypochlorite is positioned within a water tank of a conventional home flush toilet system.

Compounds such as calcium hypochlorite employed in such services as a sanitizer or toilet bowl cleaner have a high susceptibility of rapid dissolution of the chlorine releasing compound into the water, thereby adding undesirable large amounts of calcium hypochlorite to the water and requiring frequent replenishment of the calcium hypochlorite even in situations where surrounding water currents are minimal.

The prior art discloses several attempts to solve this problem, for example, by encapsulating the calcium hypochlorite as disclosed in U.S. Pat. No. 3,856,932, issued to Michael Axton May on Dec. 24, 1974.

The prior art also discloses numerous deodorizing and disinfecting dispensers of one sort or another for dispensing chlorine releasing compounds such as calcium hypochlorite in conventional home flush toilet systems. Many of these dispensers employ orifices on the device for controlling the dissolution rate of the chlorine releasing compound into the water.

A common persistant problem of these and other methods of properly dispensing chlorine releasing compounds is that the dispensers dispense excessive amounts of chemical to the water in the flush tank even when orificed containers are employed, requiring frequent insertion of one's hand into the toilet flush tank to check the supply of the chlorine releasing compound and to replenish the supply therein.

There is a long felt need for a method of dispensing only the required amount of chlorine releasing compound to a water solution to prevent scale formation.

OBJECTS

It is a primary object of this invention to provide a method for preventing scaling in water containing devices such as conventional home toilet tanks and flushed bowls on an efficient basis.

It is another object of this invention to provide a method for treating water containing devices whereby such devices can be cleaned and sanitized on a continuous, efficient basis over extended periods of time employing very small but effective and long lasting amounts of compound.

It is a general object of this invention to provide a method for automatic toilet bowl cleaning and sanitizing, and preventing scaling which involves very simple operating steps.

It is an additional object of this invention to provide a method for inhibiting scale formation in water containing devices whereby the need for close control of the solubility of the chlorine-containing compound is unnecessary.

These and other objects of the invention will become apparent from the following description and the appended claims.

BRIEF DESCRIPTION OF THE INVENTION

The foregoing objects of the invention are accomplished in a process for inhibiting scale formation on the interior surfaces of a water containing device, which comprises maintaining an aqueous dibasic magnesium hypochlorite solution in contact with the interior surfaces of said water containing device, whereby the formation of scale on the surfaces is inhibited.

Even though dibasic magnesium hypochlorite has a low solubility in water, it is dissolved in the water to provide available chlorine as an antiscalant and toilet bowl cleaner in small but effective scale inhibiting and long lasting amounts, thereby eliminating the need for an orificed dispenser.

DETAILED DESCRIPTION OF THE INVENTION

The term "water containing device" as used throughout the description and claims is any device which transports, houses, contains, contacts or diverts water.

Water containing devices which may be cleaned by the process of this invention include any such device wherein water is stored, wherein water flows intermittently and wherein water flows continuously therethrough.

Examples of water containing devices include buckets, basins, tubs, pails, containers, pots, toilets, strainers, reservoirs, glasses, cups, gutters, collection headers, skimmers, urinals, water closets, canals, piping, humidifiers, swimming pools, chemical process equipment such as condensors, boilers, and the like.

The water containing device may be any suitable shape or form desired. Both solid and perforated water containing devices may be employed.

Examples of suitable materials of construction of water containing devices include porcelain, tile, china, aluminum, galvanized metals such as galvanized tin, plastics such as polytetrafluoroethylene, polycarbonate, polyvinyl chloride, polypropylene, polyethylene, and the like.

The term "water" as used throughout the description and claims is intended to include distilled water, river water, sea water, aqueous solutions of alkali metal salts, aqueous solutions of alkaline earth metal salts, spring water, rain water, well water, treated water, untreated water, steam condensate, artesian well water, lake water, and mixtures thereof which exhibit a tendency to deposit any insoluble materials contained therein, such as the alkaline earth metal salts, upon contact with the surface of a water containing device. Such deposition results in the formation of a scale, film, crust, or stain on the surface of the water containing device.

Examples of aqueous solutions of alkaline earth metal salts include aqueous solutions of salts such as calcium carbonate, magnesium carbonate, magnesium hydroxide, and mixtures thereof.

The concentration of these and other salts is in the range from about 1 to about 50,000 parts per million by weight.

Although the process of this invention may be employed in any device which contains water, a preferred use is a conventional flush toilet system and the invention is described as applied to such system. In other uses, the temperature, components of the water and their respective concentrations may differ significantly from the characterization of the toilet bowl water.

The conventional home flush toilet system is comprised of a toilet flush tank containing about 10 gallons of flush water connected to an associated porcelain toilet bowl containing about five gallons of water. Periodic release of the toilet flush tank water to the toilet bowl is accomplished by tripping a lever which activates a series of valves within the toilet flush tank to allow the toilet bowl water to drain. Water from the toilet flush tank flows through the toilet bowl and refills the toilet bowl. Water from a public water supply such as a well, lake, or reservoir is commonly employed thereafter to refill the toilet flush tank.

Typical public water supplies employed in a conventional home flush toilet in the United States are described in a *Handbook of Chemistry* by Norbert Adolph Lange, Ninth Edition, pages 804–807 and are shown in Table I. The public water supply may contain varying amounts of many components in concentrations in the range from about a trace to about the maximum amount shown. Public water supplies from certain localities in the United States and the world may contain other components in addition to those shown below. In certain localities, the concentrations shown below may be exceeded.

TABLE I

| | parts per million (ppm) | |
|---|---|---|
| Component | Typical Concentration | Maximum Concentration |
| Total Dissolved Solids | 250 | 1,000 |
| Silica ($SiO_2$) | Trace | 100 |
| Iron (Fe) | Trace | 50 |
| Calcium (Ca) | 60 | 100 |
| Magnesium (Mg) | 2.0 | 50 |
| Sodium and Potassium (Na + K) | Trace | 500 |
| Bicarbonate ($HCO_3{}^-$) | Trace | 500 |
| Sulfate ($SO_4{}^=$) | Trace | 250 |
| Chloride ($Cl^-$) | 20 | 100 |
| Nitrate ($NO_3{}^-$) | 0.5 | 50 |
| Total Hardness* | 160 | 500 |

*Calculated as calcium carbonate.

One property used to describe water is "total hardness" which is a measure of dissolved calcium and magnesium salts of bicarbonates, carbonates, chlorides, nitrates, sulfates, silicates and hydroxides. In some waters, iron and manganese also contribute to total hardness. In localities tapping surface waters, the average "total hardness" of finished water may be about 85 ppm. In those localities tapping ground water, the average "total hardness" may be about 160 ppm.

The total dissolved solids is the total amount of all solid materials present in the water.

The material contacting a typical toilet flush bowl is the flush water and the normal human excretement and urination.

The bulk of human material added to the water in the flush bowl of a conventional home toilet is urine. The normal range of urine is described in a *Handbook of Chemistry*, by Norbert Adolph Lange, Ninth Edition, page 813 and is listed in Table II, below.

TABLE II

| Urine Normal Range of Composition | | |
|---|---|---|
| Quantity: | 1,000 to | 1,500 cubic centimeters/24 hrs. |
| Calcium: | 0.1 to | 0.3 grams/24 hrs. |
| Potassium: | 1.5 to | 2.0 grams/24 hrs. |
| Magnesium: | 0.1 to | 0.2 grams/24 hrs. |

It is well known that when urine such as described in Table II as well as feces are added in regular fashion to water such as described in Table I, that a film, scale, crust, or stain forms on the surface of the toilet bowl.

U.S. Pat. No. 3,997,460, issued to Gloria F. Sirine, Inesis A. J. Day, and Stephen J. Kahn on Dec. 14, 1976, teaches that toilet bowl scale contains salts of calcium, magnesium, iron, and the like. The patent also teaches that toilet bowl stains are principally hard water, iron and organic substances such as fecal and algae. It is possible that copper and manganese salts also contribute to the scale and stain. It is further taught that bacteria are associated with such stains and contribute toward glueing or cementing such stains together.

The temperature of the water in the flush tank and in the toilet bowl is environmentally dependent but is usually in the range from about 1° to about 50° C., and preferably in the range from about 15° to about 30° C.

The pressure in the flush tank and in the flush bowl is essentially atmospheric but may be sub-or superatmospheric, if desired.

The amount of dibasic magnesium hypochlorite initially employed in a typical home flush toilet is in the range from about 100 to about 1000 grams, and preferably in the range from about 150 to about 500 grams.

Granules of dibasic magnesium hypochlorite are generally placed in a container such as an open top polyethylene cup. The dimensions of the cup are commensurate with the amount of dibasic magnesium hypochlorite employed.

Typically, the diameter of the cup is in the range from about 2 to about 10 centimeters and the height is in the range from about 2 to about 10 centimeters.

Although not strictly required, any inert water insoluble material, such as any suitable ballast may be added to the cup before or after the addition of the dibasic magnesium hypochlorite thereto. The size of the inert ballast such as gravel, rock, stone, and the like is in the range from about 0.2 to about 5.0 centimeters, and preferably in the range from about 0.5 to about 2.5 centimeters. The inert ballast is employed to counteract buoyancy and to minimize movement of the cup containing dibasic magnesium hypochlorite due to water currents.

The cup containing the dibasic magnesium hypochlorite and ballast is placed within a conventional toilet tank below the normal water level so that the dibasic magnesium hypochlorite is exposed to the flush tank water contained therein.

A portion of the dibasic magnesium hypochlorite is soluble in the flush tank water and is dissolved in the flush water tank. This portion of dissolved dibasic magnesium hypochlorite provides a small but effective amount of available chlorine to inhibit scale formation on the contacted interior surfaces. Generally, an effective concentration of available chlorine from the dibasic magnesium hypochlorite is in the range from about 0.1 to about 20.0, and preferably in the range from about 0.5 to about 5.0 parts per million by weight of available chlorine derived from the dibasic magnesium hypochlorite. This available chlorine is in addition to any available chlorine which may be present in the water initially. Generally, the total available chlorine present in the water initially is in the range from about 0.2 to about 0.6 part per million total available chlorine (free and combined) by weight. When the toilet is activated, the flush tank water containing the dissolved dibasic magnesium hypochlorite is carried into the toilet flush bowl to contact the toilet bowl surface.

Without being bound by theory, it is believed that the dibasic magnesium hypochlorite in the water coats or cleans the surface of the toilet bowl thereby preventing solids such as calcium carbonate, iron, manganese, and the like from adhering thereto. It is also believed that dibasic magnesium hypochlorite attacks bacteria associated with stains thereby eliminating toilet bowl stain as well as sanitizing the water contained therein.

The dibasic magnesium hypochlorite may contain minor amounts of calcium hypochlorite, lithium hypochlorite, magnesium hypochlorite, dibasic calcium hypochlorite, and basic magnesium hypochlorite.

A preferred method of preparing granules of dibasic magnesium hypochlorite is disclosed in U.S. Pat. No. 4,071,605, supra, wherein a solid magnesium salt such as magnesium chloride hexahydrate is reacted with a solid hypochlorite such as hydrated calcium hypochlorite. The reaction proceeds at ambient temperature in a vented reaction vessel. The teaching of this patent is incorporated herein in its entirety by reference.

The dibasic magnesium hypochlorite employed in the process of this invention may also be prepared according to any suitable method of common knowledge, for example, as disclosed in U.S. Pat. No. 3,582,265, issued to John J. Bishop and Samuel I. Trotz on June 1, 1971. The teaching of this patent is incorporated herein in its entirety by reference.

When prepared according to U.S. Pat. No. 4,071,605, supra, the size of the granules of dibasic magnesium hypochlorite is in the range from about 1 to about 1,000 microns, and preferably in the range from about 50 to about 900 microns in diameter.

The dibasic magnesium hypochlorite contains over about 50 percent available chlorine and less than about one percent water by weight.

Although not required, dibasic magnesium hypochlorite employed in the process of this invention may have its particle size suitably diminished to increase the rate of dissolution of dibasic magnesium hypochlorite in water. Suitable means which may be employed to effect a particle size reduction include grinding, crushing, and the like.

It is also recognized that dibasic magnesium hypochlorite employed in the process of this invention may have its particle size increased by methods known in the art such as compressing, binding, combinations thereof, and the like.

Any convenient form and shape of dibasic magnesium hypochlorite may be employed in the process of this invention. For example, dibasic magnesium hypochlorite may be in the form of wires, rods, tablets, dry powders, pellets, pills, and the like, and mixtures thereof.

In one embodiment, dibasic magnesium hypochlorite in dry powder form may be compressed into pellets, tablets, wires, rods, pills, and the like in any suitable compression device employing pressures in the range from about 1 to about 10 tons, and preferably in the range from about 2 to about 8 tons.

In another embodiment, the dibasic magnesium hypochlorite may be formed in any desired shape, such as a rectangle, and secured to an inert attachment means such as a plastic coated wire, a wooden rod, or plastic rod by means of compression as outlined previously. The wire or rod containing the dibasic magnesium hypochlorite may be positioned or secured to the walls of the toilet flush tank.

Alternately, the granular dibasic magnesium hypochlorite may be compressed from dry powder into tablet form of uniform size and weight. The thickness of the tablets employed is in the range from about 1 to about 5 centimeters, and preferably in the range from about 2 to about 4 centimeters.

The diameter of the tablets is in the range from about 1 to about 5 centimeters, and preferably from about 2 to about 4 centimeters. The tablets or pellets may be randomly dispersed in the water throughout the toilet flush tank, collected in one section of the toilet flush tank, or contained within at least one container inside the toilet flush tank, such as an open, circular cup positioned below the water level as previously described.

Although not required, when dibasic magnesium hypochlorite is employed in tablet or pellet form, a partial encasement of the tablet or pellet with an inert insoluble material may be effected. For example, a continuous perforated or solid band of inert insoluble material which adheres to the dibasic magnesium hypochlorite may be placed therearound.

U.S. Pat. No. 3,856,932, supra, discloses a method for encapsulating a tablet of chlorine releasing compound, such as an alkaline earth metal hypochlorite.

When the dibasic magnesium hypochlorite is employed in dry powder, tablet, or pellet form, and the like, or mixtures thereof, the dibasic magnesium hypochlorite may be contained in any suitable dispenser, for example, a bag such as a cloth bag, positioned within the toilet flush tank or connected thereto.

It is to be recognized that a suitable binder may be employed to enhance the binding characteristics of the dibasic magnesium hypochlorite. Examples of suitable binders which may be employed in the process of this invention include water as well as salts, in solid or solution form, such as silicates, stearates, mixtures thereof, and the like.

Although not required, a perfume or odorant may be employed with the dibasic magnesium hypochlorite, if desired.

The following examples are presented to define the invention more fully without any intention of being limited thereby. All parts and percentages are by weight unless indicated otherwise.

EXAMPLE 1

Dibasic magnesium hypochlorite was employed as a sanitizer, an antiscalant and toilet bowl cleaner in one toilet flush tank and toilet bowl of a conventional home flush toilet system.

The dibasic magnesium hypochlorite was prepared by reacting solid magnesium chloride hexahydrate with hydrated calcium hypochlorite as disclosed in U.S. Pat. No. 4,071,605, issued to John A. Wojtowicz on Jan. 31, 1978.

The resulting dibasic magnesium hypochlorite had a particle size distribution as shown in Table III.

TABLE III

Particle Size Distribution
Dibasic Magnesium Hypochlorite

| Sieve Designation | | |
|---|---|---|
| Micron | No. | % Retained By Weight |
| 841 | 20 | 20.8 |
| 420 | 40 | 27.1 |
| 250 | 60 | 12.8 |
| 149 | 100 | 14.4 |
| 74 | 200 | 11.4 |
| % Passing Thru the 74 Micron and No. 200 Sieve | | 13.5 |

Table III was based on U.S. Sieve Series, ASTM E-11-61, adopted 1961. Lange's *Handbook of Chemistry*, John A. Dean, 11th Edition, Table 11-1, page 11-2. The dibasic magnesium hypochlorite was found by analysis to contain about 52 percent available chlorine.

About 155 grams of gravel (rocks), whose particle diameter ranged from about 0.5 to about 1.5 centimeters was placed in an open top, polyethylene circular cup having a diameter of about 7.6 centimeters and a height of about 7.6 centimeters.

About 255 grams of dibasic magnesium hypochlorite prepared as previously described, was added to the circular cup atop the gravel. The cup was nearly full.

The open top, circular cup containing both the rocks and the dibasic magnesium hypochlorite was placed in the bottom of a water flush tank (below the water level) of a conventional porcelain toilet in a home located in Cheshire, Conn., occupied by a family of five. The porcelain toilet bowl had been thoroughly cleaned prior to placing the open top cup containing dibasic magnesium hypochlorite and gravel in the toilet flush tank.

Water employed as flush water to the flush toilet was supplied by the New Haven Water Company, North Cheshire, Conn. Well Supply. A typical analysis of this water was:

| | | |
|---|---|---|
| pH | 7.2 | |
| Chloride | 17 | ppm |
| Fluoride | 1.0 | ppm |
| Calcium | 59 | ppm |
| Magnesium | 2.0 | ppm |
| Total Solids | 253 | ppm |
| Alkalinity | 81 | ppm |
| Hardness as Calcium Carbonate (CaCO$_3$) | 155 | ppm |
| Phosphates | 1.0 | ppm |
| Total Available Chlorine (combined and free) | 0.5 | ppm | where ppm is expressed as parts per million by weight and alkalinity is a measure of the amount of bicarbonate, carbonates and hydroxides present in the toilet water.

The toilet was utilized by the family on a daily basis over a five-month period. The toilet tank capacity was about 12 gallons. The porcelain toilet bowl capacity was about three gallons. The number of flushes per day averaged about 7. About 15 gallons of flush water were employed per flush.

Neither the toilet tank nor the toilet bowl was manually cleaned during the period of this example. No other chemical was added to the toilet tank or toilet bowl during the period of this example.

The toilet bowl was examined periodically for evidence of scaling, film, crust, stain, and odor. None was found. After about five months, the toilet bowl remained scrupulously clean, free or scale and odor free after normal daily human use. No film or stain was noted on the toilet bowl.

About 178 grams of dibasic magnesium hypochlorite remained in the open, circular cup after above five months, in addition to about 155 grams of the gravel.

The percent available chlorine employed over the five months was calculated as about 30 percent of the total available chlorine initially placed in the cup. This indicated a useful life for about 255 grams dibasic magnesium hypochlorite as about one and one quarter years. The total amount of available chlorine dissolved in the water above the available chlorine initially present was calculated as about 1.0 part per million by weight total available chlorine in water.

COMPARATIVE EXAMPLE A

In Comparative Example A, conditions were the same as employed in Example 1, except that commercial calcium hypochlorite was employed in place of dibasic magnesium hypochlorite.

Typical commercial calcium hypochlorite has a particle size distribution as shown in Table IV.

TABLE IV

Particle Size Distribution
Typical Commercial Calcium Hypochlorite

| Sieve Designation | | |
|---|---|---|
| Micron | No. | % Retained by Weight |
| 1410 | 14 | 0.4 |
| 841 | 20 | 49.0 |
| 595 | 30 | 23.6 |
| 420 | 40 | 12.4 |
| 297 | 50 | 11.0 |
| 250 | 60 | 2.1 |
| 210 | 70 | 1.2 |
| % Passing Thru the 210 Micron and No. 70 Sieve | | 0.3 |

The available chlorine analyzed about 70 percent. The calcium hypochlorite contains less than about 3 percent water.

About 225 grams of commercial calcium hypochlorite was added to a similar size open top, circular cup placed in a similar toilet flush tank of a conventional home flush toilet in the same home as described in Example 1. Comparative Example A proceeded simultaneously with Example 1. The degree of daily use was about the same.

After about four months, the calcium hypochlorite was completely consumed, accompanied by a total loss of disinfection, antiscaling or bowl-cleaning action. After about two to three weeks, a scale rapidly built up on the toilet bowl surface necessitating manual cleaning. Comparative Example A demonstrated scale build up on the toilet bowl surface, even though residual available chlorine was present in the amount of 0.5 part per million from the chlorination of the water by the Water Company. Comparison of the results of Example A with the results of Example 1, clearly demonstrate the effective scale inhibiting properties of the available chlorine derived from dibasic magnesium hypochlorite.

What is claimed is:

1. A process for inhibiting scale formation on the interior surfaces of a toilet bowl or a toilet flush tank, which comprises maintaining an aqueous dibasic magnesium hypochlorite solution in contact with said interior surfaces, said aqueous solution having an available chlorine concentration in the range from about 0.1 to about 20.0 parts per million by weight, said chlorine concentration derived from solid granules of dibasic magnesium hypochlorite maintained within said toilet bowl or said toilet tank, and in contact with said aqueous solution, whereby the formation of scale on said interior surfaces is inhibited.

2. The process of claim 1, wherein said granules are maintained in a container within said toilet bowl or said toilet flush tank.

3. The process of claim 2, wherein pieces of an inert insoluble material are positioned with said granules within a circular cup within said toilet tank or said toilet bowl.

4. The process of claim 3, wherein pieces of inert insoluble material are gravel.

5. The process of claim 1 wherein the size of said granules is in the range from about 1 to about 1,000 microns.

6. The process of claim 5 wherein the size of said granules is in the range from about 50 to about 900 microns.

7. The process of claim 6 wherein said granules are contained in a circular cup within said water containing device.

8. The process of claim 7 wherein said concentration in said solution is in the range from about 0.5 to about 5.0 parts per million by weight.

9. The process of claim 8 wherein pieces of an inert water insoluble material are positioned within said circular cup.

10. The process of claim 9 wherein the size of said inert water insoluble material is in the range from about 0.2 to about 5.0 centimeters.

11. The process of claim 10 wherein the size of said inert water insoluble material is in the range from about 0.5 to about 2.5 centimeters.

12. The process of claim 11 wherein said inert water insoluble material is gravel.

13. The process of claim 12 wherein said dibasic magnesium hypochlorite is added to said toilet bowl.

* * * * *

UNITED STATES PATENT AND TRADEMARK OFFICE
CERTIFICATE OF CORRECTION

PATENT NO. : 4,253,950
DATED : March 3, 1981
INVENTOR(S) : John A. Wojtowicz

It is certified that error appears in the above-identified patent and that said Letters Patent are hereby corrected as shown below:

Column 3, in TABLE I, the third line beneath the column headings should be changed from:

| Component | parts per million (ppm) | |
| --- | --- | --- |
| | Typical Concentration | Maximum Concentration |
| Iron (Fe) | Trace 50 | | so as to read:

UNITED STATES PATENT AND TRADEMARK OFFICE
CERTIFICATE OF CORRECTION

PATENT NO. : 4,253,950
DATED : March 3, 1981
INVENTOR(S) : John A. Wojtowicz

It is certified that error appears in the above-identified patent and that said Letters Patent are hereby corrected as shown below:

| Component | parts per million (ppm) | |
|---|---|---|
| | Typical Concentration | Maximum Concentration |
| Iron (Fe) | Trace | 50 |

Signed and Sealed this

Thirtieth Day of June 1981

[SEAL]

Attest:

RENE D. TEGTMEYER

Attesting Officer

Acting Commissioner of Patents and Trademarks